United States Patent
Boetje et al.

(10) Patent No.: US 7,006,603 B2
(45) Date of Patent: Feb. 28, 2006

(54) SYSTEMS, METHODS AND COMPUTER PROGRAM PRODUCTS FOR AUTOMATICALLY PUSHING A STATUS CHANGE MESSAGE AS A RESULT OF REPAIR SERVICES THAT ARE PERFORMED ON A PUBLIC SWITCHED TELEPHONE NETWORK (PSTN)

(75) Inventors: Michael B. Boetje, Lawrenceville, GA (US); Rita H. Scherer, Birmingham, AL (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 208 days.

(21) Appl. No.: 10/389,089

(22) Filed: Mar. 14, 2003

(65) Prior Publication Data

US 2004/0179654 A1    Sep. 16, 2004

(51) Int. Cl.
*H04M 1/24*    (2006.01)
*H04M 3/08*    (2006.01)
*H04M 3/22*    (2006.01)
*G06F 11/00*    (2006.01)

(52) U.S. Cl. .................. 379/9.03; 379/9.02; 379/9.04; 714/48; 714/57

(58) Field of Classification Search ............. 379/9.02, 379/9.03, 9.04, 14.01, 15.01, 15.02, 15.04; 714/46, 48, 49, 51, 57; 705/8
See application file for complete search history.

(56) References Cited

U.S. PATENT DOCUMENTS

| | | | |
|---|---|---|---|
| 5,416,833 A | 5/1995 | Harper et al. | |
| 5,491,742 A | 2/1996 | Harper et al. | |
| 5,644,619 A | 7/1997 | Farris et al. | |
| 5,687,212 A | 11/1997 | Kinser, Jr. et al. | |
| 5,790,633 A | 8/1998 | Kinser, Jr. et al. | |
| 5,790,634 A | 8/1998 | Kinser, Jr. et al. | |
| 5,881,131 A | 3/1999 | Farris et al. | |
| 5,953,389 A | 9/1999 | Pruett et al. | |
| 6,032,184 A * | 2/2000 | Cogger et al. | 709/223 |
| 6,219,648 B1 * | 4/2001 | Jones et al. | 705/8 |
| 6,353,902 B1 * | 3/2002 | Kulatunge et al. | 714/712 |
| 6,389,426 B1 * | 5/2002 | Turnbull et al. | 707/102 |
| 6,516,055 B1 * | 2/2003 | Bedeski et al. | 379/32.01 |
| 6,763,333 B1 * | 7/2004 | Jones et al. | 705/8 |
| 6,788,765 B1 * | 9/2004 | Beamon | 379/27.01 |
| 2002/0087680 A1 * | 7/2002 | Cerami et al. | 709/224 |

* cited by examiner

*Primary Examiner*—Quoc Tran
(74) *Attorney, Agent, or Firm*—Myers Bigel Sibley & Sajovec

(57) ABSTRACT

A Public Switched Telephone Network (PSTN) administration system includes an Internet-based repair (eRepair) subsystem that is configured to accept customer trouble tickets related to the PSTN via the Internet and to provide customer trouble ticket status information to customers via the Internet. The administration system also includes a Work Force and Administration-Control (WFA/C) subsystem that is configured to manage repair services that are performed on the PSTN in response to the customer trouble tickets. A repair status update system, method and/or computer program product is configured to automatically push a status change message from the WFA/C subsystem to the eRepair subsystem upon occurrence of a change in a status of a customer trouble ticket in the WFA/C subsystem as a result of repair services that are performed on the PSTN. The customer trouble ticket status information is updated in response to receipt of the status change message.

32 Claims, 22 Drawing Sheets

Open a Trouble Ticket

* Denotes Field is Required

| | |
|---|---|
| Circuit ID: | 10/IBSD/511115/SC |
| Account Name: | Atchison Consulting and Web Design |
| Account Address: | 1313 Mockingbird Lane |
| A Location: | CLRMMATT |
| A Location Address: | 555 BellSouth Road |
| Z Location: | CLRMMATC |
| Z Location Address: | 1313 Mockingbird Lane Unit #5 |

*Reported By: [       ]

*Contact Number: ( [   ] ) [   ] - [   ] ext: [   ]

Premise Contact Name: [       ]

Premise Contact Number: ( [   ] ) [   ] - [   ] ext: [   ]

Custom Ticket #: [       ]  1-10 characters (example: ebris1879)

*Trouble Category:
```
Choose One Of The Following Options:
Trouble Receiving Calls
Noise Trouble
```

*Trouble Type:
```
Choose One Of The Following Options:
```

*Trouble Description: [       ]
(max length 100 characters)

* Premise Access Hours: [09:00 a.m. ▼] to [05:00 p.m. ▼]
Note: If you require a call prior to dispatch or have other special access needs, please indicate in the Trouble Description field.

*Do you Authorize Intrusive Testing?
Testing is required for trouble isolation. If you do not authorize intrusive testing, manual intervention will be required. This may slow the process of closing your ticket.
⊙ yes  ○ no

*Do you Authorize a Dispatch on this Trouble? (Charges may Apply)
⊙ yes  ○ no (clear) (continue)

Custom Ticket Number

This option allows the ability to track trouble reports with your custom trouble ticket number.

1-10 characters
(example: elvis$877)

The Custom Ticket Number is for eRepair tracking purposes ONLY and is stored exclusively in the eRepair web application.

submit

Note: The Custom Ticket Number cannot be modified once it has been submitted.

FIG. 11G

| | |
|---|---|
| Trouble Ticket Number: AB196223 | |
| Custom Ticket #: | demo123 |
| Telephone #/Circuit ID: | 10/IBSD/511115/SC |
| Reported Date/Time: | 02/08/2001 08:21:00 |
| Reported By: | Elvis Presley |
| Contact Number: | 222-333-4444 |
| Account Name: | Atchison Consulting and Web Design |
| Account Address: | 1313 Mockingbird Lane |
| A Location: | CLRMMATT |
| A Location Address: | 555 BellSouth Road |
| Z Location: | CLRMMATC |
| Z Location Address: | 1313 Mockingbird Lane Unit #5 |
| Trouble Reported: | No Dial Tone |
| Status Information: | |
| 02/08/2001 08:20:33 | Statused Mike at 8:19 will require dispatch to facilities |
| 02/08/2001 08:21:00 | Dispatched To BellSouth Central Office Technician |
| 02/08/2001 06:11:12 | Mechanized Testing Complete - Requires Further Analysis By BellSouth Repair Technician |
| 02/08/2001 06:11:12 | ETA 02/08/2001 12:14:22 |
| 02/07/2001 05:29:04 | Mechanized Testing In Progress |

View Trouble History for this Circuit ID/Telephone Number
Back to Ticket Summary

FIG. 11H

Trouble Ticket Details

Trouble Ticket Number: AB196223

| | |
|---|---|
| Custom Ticket #: | demo123 |
| Telephone #/Circuit ID: | 10/IBSD/511115/SC |
| Reported Date/Time: | 02/08/2001 08:21:00 |
| Reported By: | Elvis Presley |
| Contact Number: | 222-333-4444 |
| Account Name: | Atchison Consulting and Web Design |
| Account Address: | 1313 Mockingbird Lane |

Trouble Reported: Sync No Surf

Status Information:

| | |
|---|---|
| 02/08/2001 08:20:33 | Statused Mike at 8:19 will require dispatch to facilities |
| 02/08/2001 08:21:00 | Dispatched To BellSouth Central Office Technician |
| 02/08/2001 06:11:12 | Mechanized Testing Complete – Requires Further Analysis By BellSouth Repair Technician |
| 02/08/2001 06:11:12 | ETA 02/08/2001 12:14:22 |
| 02/07/2001 05:29:04 | Mechanized Testing In Progress |

View Trouble History for this Service
Back to Ticket Summary

FIG. 11I

Company Information

Account Name: DEMO ACCOUNT

User Profile Information

* Denotes Field is Required

- Customer Id: EREREP0001
- *First Name: Elvis
- *Last Name: Presley
- *Primary Contact Number: ( 222 ) 333 - 4444 ext: 5555
- Alternative Contact Number: (    )    -      ext:
- *Email Address: e.Presley@bellsouth.net
  (e.g., jsmith@bellsouth.com)
- *Re-Enter Email Address: e.Presley@bellsouth.net
  (e.g., jsmith@bellsouth.com)

Account Preferences

*Once your account is created you will have the ability to return at anytime to change the following options.*

Select Ticket view:

○ I only want to see Voice line related tickets
○ I only want to see Data line related tickets
● I want to see both Voice and Data tickets Note: *The separation of Voice and Data is based on the way Circuit IDs/TNs a Inventoried within BellSouth databases. Therefore, eRepair may display Circ IDs and/or TNs outside of your selection.*

Select Email Option:

○ Email me a status report when my trouble ticket status changes to one of the following statuses ○ Email me a status report when my trouble ticket status changes to one of the above statuses AND send me a status report of all open trouble tickets at selected time interval Time Preferences [Select One ▼]

● Do not send me status reports via email

The following options are only applicable if you have chosen to receive status emails
Email subject line will include:

● Circuit ID/Telephone number
○ BellSouth Ticket #
○ My Custom Ticket # (if not available Circuit ID/TN will be used)

Only send emails on selected days:

| mon | tue | wed | thur | fri | sat | sun |
|-----|-----|-----|------|-----|-----|-----|
| ☑ | ☑ | ☑ | ☑ | ☑ | ☑ | ☑ |

Only send emails during selected hours:
From: [12:00 a.m. ▼] to [12:00 a.m. ▼]

( clear ) ( continue )

FIG. 11J

FIG. 11K eRepair Status 201T1ZFJCVLFLAFN03JCVLFLSJDC0
From: health.bizcon@bellsouth.com
Sent: Tuesday, January 28, 2003 11:47 AM
To: erepair.uat@bellsouth.com
Subject: eRepair Status: 201/T1ZF/JCVLFLAFN03/JCVLFLSJDC0

| | |
|---|---|
| Trouble Ticket Number: | AA018249 |
| TN/Circuit ID: | 201/T1ZF/JCVLFLAFN03/JCVLFLSJDC0 |
| Custom Ticket Number: | dms012703 |
| Prior Status: | Trouble Ticket Accepted |
| Current Status: | Access needed - Please call the BellSouth Repair Center |
| Modified Time: | 01/28/2003 |

This message is a system-generated email. Please do not respond to this message.

Receipt of this email indicates that you have selected to receive pro-active status reports from the BellSouth eRepair application. If you no longer desire pro-active email notifications, please update your eRepair profile at http://www.bellsouth.com/erepair.

Thank you for using BellSouth!

FIG. 12A eRepair Status 3524863370
From: health.bizcon@bellsouth.com
Sent: Tuesday, January 28, 2003 11:47 AM
To: erepair.uat@bellsouth.com
Subject: eRepair Status: 3524863370

| | |
|---|---|
| Trouble Ticket Number: | 0426298 |
| TN/Circuit ID: | 3524863370 |
| Custom Ticket Number: | |
| Prior Status: | Known central office failure Multiple lines affected |
| Current Status: | Known cable failure in area - Multiple lines affected |
| Modified Time: | 01/28/2003 |

This message is a system-generated email. Please do not respond to this message.

Receipt of this email indicates that you have selected to receive pro-active status reports from the BellSouth eRepair application. If you no longer desire pro-active email notifications, please update your eRepair profile at http://www.bellsouth.com/erepair.

Thank you for using BellSouth!

FIG. 12B

```
                    eRepair Status 4072072968
From: health.bizcon@bellsouth.com
Sent: Tuesday, January 28, 2003 12:40 PM
To: erepair.uat@bellsouth.com
Subject: eRepair Status: 407/207/2968
```

| | |
|---|---|
| Trouble Ticket Number: | AA018250 |
| TN/Circuit ID: | 407/207/2968 |
| Custom Ticket Number: | dms012703 |
| Prior Status: | Miscellaneous Issue that has been referred to another Bellsouth center or entity for resolution |
| Current Status: | Your Trouble Ticket has been closed |
| Modified Time: | 01/28/2003 |

This message is a system-generated email. Please do not respond to this message.

Receipt of this email indicates that you have selected to receive pro-active status reports from the BellSouth eRepair application. If you no longer desire pro-active email notifications, please update your eRepair profile at http://www.bellsouth.com/erepair.

Thank you for using BellSouth!

FIG. 12C

```
                    EREPAIR STATUS PUSH MESSAGE
WFA TR#: SV040861    WFA CKT ID: P 536/041/2041
DATE: 04/16/02   TIME: 11:20    WFA SYS TIME ZONE ID: EDT
PCT: NDC ACNA:        MCN: BELLCORE               CCNA:
EREPAIR: JOHN SMITH          ;CR;041602;1126;64 AVENUE C EDISON
       ;NDT ;JOHN SMITH          ;2017323600        ;041602;1126;041602;1
ISCATAWAY           ;64 AVENUE C EDISON                      ;PISCATAWAY
    ;20 AVENUE C EDISON                    ;TOK;AN;10 AVENUE C EDISON
              ;JACK SMITH           ;PISC&MTSSC;SMVLN;MTSSC;041602;112
0;1750;NEYC;NACELAGC;1210;600;ABC
  DESCRIPTION: SMVLNJMT  /MT /001    BELLCORE    NDSCR NTEC
              04/16/02  11:20  04/16/02  11:26  BELLNTEC
              THIRD LINE OF REMARKS  xxxxxxxxxxxxxxxxxxxxxxxxxx
              FOURTH LINE OF REMARKS xxxxxxxxxxxxxxxxxxxxxxxxxx
              FIFTH LINE OF REMARKS  xxxxxxxxxxxxxxxxxxxxxxxxxx
              SIXTH LINE OF REMARKS  xxxxxxxxxxxxxxxxxxxxxxxxxx
              SEVENTH LINE OF REMARKS xxxxxxxxxxxxxxxxxxxxxxxxx
              EIGHTH LINE OF REMARKS xxxxxxxxxxxxxxxxxxxxxxxxxx

PRESS PA2 TO CONTINUE
```

FIG. 13

SYSTEMS, METHODS AND COMPUTER PROGRAM PRODUCTS FOR AUTOMATICALLY PUSHING A STATUS CHANGE MESSAGE AS A RESULT OF REPAIR SERVICES THAT ARE PERFORMED ON A PUBLIC SWITCHED TELEPHONE NETWORK (PSTN)

FIELD OF THE INVENTION

This invention relates to the Public Switched Telephone Network (PSTN), and more particularly to systems, methods and computer program products for administering repair services that are performed on the PSTN, for example, as a result of customer trouble tickets that are submitted.

BACKGROUND OF THE INVENTION

The Public Switched Telephone Network (PSTN) has become ubiquitous for wire-line telecommunications among individual and business customers. Accordingly, it may be desirable to efficiently administer repair services that are performed on the PSTN.

It is known to provide a Work Force and Administration-Control (WFA/C) subsystem that automates work request administration and resource administration functions to provide capability for managing installation and repair services on the PSTN. Work Administration analyzes work to be done, determines resources required, manages the allocation of work to work groups and tracks completion of work steps. Force Administration determines the availability of specific human resources, assigns specific work to craft, tracks details of work completion, reports work status and handles inquiries on work status. WFA/C is a legacy system that was originally developed for the Bell telephone system, and is now used by regional operators of the PSTN and others in the telecommunications industry.

WFA/C is well known to those having skill in the art and is described, for example, in U.S. Pat. No. 6,219,648 to Jones et al. entitled Apparatus and Method for Monitoring Progress of Customer Generated Trouble Tickets; U.S. Pat. No. 5,953,389 to Pruett et al. entitled Combination System for Provisioning and Maintaining Telephone Network Facilities in a Public Switched Telephone Network; U.S. Pat. No. 5,881,131 to Farris et al. entitled Analysis and Validation System for Provisioning Network Related Facilities; U.S. Pat. No. 5,790,634 to Kinser, Jr. et al. entitled Combination System for Proactively and Reactively Maintaining Telephone Network Facilities in a Public Switched Telephone System; U.S. Pat. No. 5,790,633 to Kinser, Jr. et al. entitled System for Proactively Maintaining Telephone Network Facilities in a Public Switched Telephone Network, U.S. Pat. No. 5,687,212 to Kinser, Jr. et al. entitled System for Reactively Maintaining Telephone Network Facilities in a Public Switched Telephone Network; U.S. Pat. No. 5,644,619 to Farris et al. entitled Analysis and Validation System for Provisioning a Public Switched Telephone Network; U.S. Pat. No. 5,491,742 to Harper et al. entitled Method and Apparatus for Provisioning a Public Switched Telephone Network; and U.S. Pat. No. 5,416,833 to Harper et al. entitled Method and Apparatus for Provisioning a Public Switched Telephone Network. Accordingly, WFA/C need not be described in detail herein.

WFA/C operates in response to customer trouble tickets, also referred to herein as trouble tickets, related to the PSTN. Historically, trouble was identified by a customer notifying a service center. A trouble ticket was then generated by service center personnel and input to WFA/C. With the advent of the Internet, it has been possible to accept customer trouble tickets related to the PSTN via the Internet, and to provide customer trouble ticket status information to customers via the Internet. Accordingly, Internet-based repair subsystems, referred to herein as eRepair subsystems, have been designed by and/or for network operators and other network service providers.

FIG. 1 is a block diagram that illustrates conventional interaction between an Internet-based repair (eRepair) subsystem and a WFA/C subsystem. Referring now to FIG. 1, the eRepair subsystem 160 includes an eRepair web server 110, and an eRepair application (APP) server 120, which are collectively configured to accept customer trouble tickets related to the PSTN via the Internet and to provide customer trouble ticket status information to customers via the Internet. The eRepair subsystem 160 may interface with a Customer Records Information System (CRIS) 122 that can be used to identify the network operator's customers and the PSTN resources that may be associated with the customer. A customer information database 124 may include other customer identification information.

Still continuing with the description of FIG. 1, a Circuit Provisioning Status System-Trouble Administration (CPSS-TA) 130 provides a gateway between the eRepair subsystem 160 and the WFA/C subsystem 140. CPSS-TA 130 also may provide a gateway between a Loop Management Operating System (LMOS) host 152 and an LMOS Front End (F/E) 154, which are legacy systems that are configured to handle trouble tickets on Plain Old Telephone Service (POTS) circuits, i.e., non-design circuits, typically voice telephone lines. A trouble ticket repository 132 also may interface with CPSS-TA 130.

As was described above, the eRepair subsystem 160 may be configured to provide customer trouble ticket status information to customers via the Internet. Therefore, it may be desirable to provide current and up-to-date information to a customer on outstanding trouble tickets. In order to provide the customer with ticket status information, WFA/C is polled every 45 minutes by CPSS-TA 130, as shown at 134, to deliver all open trouble tickets to the eRepair application server 120. The eRepair application server 120 then makes a determination as to which trouble ticket had changed. A mechanism also is provided via 3270 emulation 136, to query one trouble ticket at a time to determine the current status thereof. The LMOS F/E subsystem 154 and the LMOS host 152 may also be subject to individual trouble ticket queries and the LMOS F/E subsystem 154 also is configured to allow one poll per day, as shown at 156, to deliver all open trouble tickets the eRepair application server 120 via CPSS-TA 130.

SUMMARY OF THE INVENTION

Embodiments of the present invention provide repair status update systems, methods and/or computer program products for an administration system for a Public Switched Telephone Network (PSTN) which automatically push a status change message upon occurrence of a change in the status of a customer trouble ticket. The administration system includes a network-based repair (eRepair) subsystem that is configured to accept customer trouble tickets related to the PSTN via a network such as the Internet and to provide customer trouble ticket status information to customers via the network such as the Internet. The administration system also includes a Work Force and Administration-Control (WFA/C) subsystem that is configured to manage repair services that are performed on the PSTN in response to the customer trouble tickets. In some embodiments of the present invention, the repair status update system, method and/or computer program product comprises an eRepair proactive status push module that is configured to automatically push a status change message to the eRepair subsystem upon occurrence of a change in a status of a customer trouble ticket in the WFA/C subsystem, for example, as a result of repair services that are performed on the PSTN. In other embodiments, a receiving module also is provided that is configured to receive the message and to update the customer trouble ticket status information in response to receipt of the status change message.

Embodiments of the invention may arise from a realization that conventional individual queries and/or polling techniques may be inefficient. More specifically, the individual queries may be inefficient because of the large number of trouble tickets that may be processed by WFA/C and/or LMOS at a given time. Moreover, the delivery of all open trouble tickets to an eRepair application in response to a poll may be wasteful of communications resources, and may load the processor of the eRepair application server to process all the open trouble tickets to determine status. In contrast, rather than sending all open trouble tickets to the eRepair subsystem every 45 minutes, an eRepair proactive status push module according to some embodiments of the present invention can automatically send the status of a trouble ticket when the status of that trouble ticket changes.

As was described above, in some embodiments, an eRepair proactive status push module and a receiving module may be provided to interface with an eRepair subsystem and a WFA/C subsystem, respectively. In other embodiments, this functionality may be provided within the eRepair subsystem and/or the WFA/C subsystem. Accordingly, in other embodiments of the present invention, an eRepair subsystem is configured to accept customer trouble tickets related to the PSTN via the network such as the Internet, and to provide customer trouble ticket status information to customers via the network such as the Internet. A WFA/C subsystem is configured to manage repair services that are performed on the PSTN in response to the customer trouble tickets and is further configured to automatically push a status change message to the eRepair subsystem upon occurrence of a change in a status of a customer trouble ticket, for example, as a result of repair services that are performed on the PSTN. In other embodiments, the eRepair subsystem is further configured to update the customer trouble ticket status information in response to receipt of the status message.

In all of the above-described embodiments, the eRepair subsystem may be further configured to allow customer access, via the network such as the Internet, to the customer trouble ticket status that is updated. In other embodiments, the eRepair subsystem is further configured to inform the customer, via electronic mail (email), that the customer trouble ticket status has been updated. In still other embodiments, the WFA/C subsystem is further configured to allow selection by an operator of the PSTN and/or by a customer, of the change in status and/or the customer trouble ticket for which a status change message is automatically sent to the eRepair subsystem. Accordingly, WFA/C administrators and/or eRepair customers can define a set of specific status changes and/or trouble tickets that should be pushed to the eRepair application.

Accordingly, embodiments of the invention can proactively deliver status changes directly to an eRepair application when the status of a customer trouble ticket changes. Up-to-date customer trouble ticket status information may be provided to customers via the Internet, without the need for excessive overhead that may be caused by a poll of all open trouble tickets and/or individual queries.

It will be understood that embodiments of the present invention may be provided as systems, methods and/or computer program products. Moreover, although embodiments of the invention may be used with the legacy WFA/C subsystem and a conventional eRepair subsystem, they are not so limited. Thus, as used herein, the term "WFA/C" denotes any system that is configured to manage repair services that are performed on the PSTN in response to customer trouble tickets and the term "eRepair" is used to denote any network-based repair subsystem (for example using a local or wide area network, and intranet, extranet and/or the Internet) that is configured to accept customer trouble tickets related to the PSTN via the network, and to provide customer trouble ticket status information to customers via the network.

BRIEF DESCRIPTION OF THE DRAWINGS

FIGS. 11A–11K are screen shots of a graphical user interface that may be used in various embodiments of the present invention.

FIGS. 12A–12C are examples of emails that may be sent to customers to indicate a status update according to embodiments of the present invention.

FIG. 13 is an example of a status change message that may be sent according to embodiments of the present invention.

DETAILED DESCRIPTION OF PREFERRED EMBODIMENTS

Figure 1:
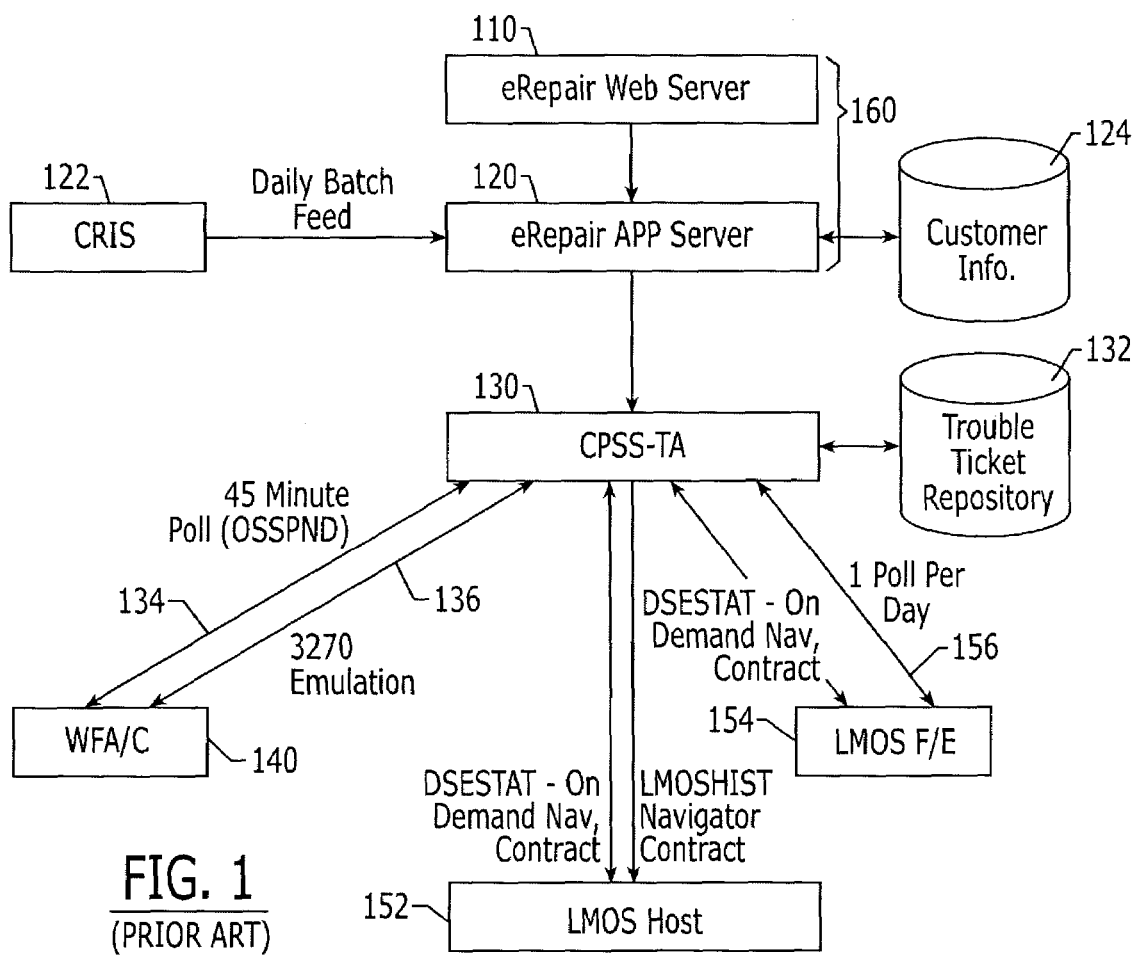
FIG. 1 is a block diagram of a conventional Internet-based repair subsystem and a work force administration and control subsystem.

The present invention now will be described more fully hereinafter with reference to the accompanying figures, in which embodiments of the invention are shown. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

The present invention is described below with reference to block diagrams and/or flowchart illustrations of methods, apparatus (systems) and/or computer program products according to embodiments of the invention. It is understood that each block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks. It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

In order to facilitate a complete understanding of the present invention, the present Detailed Description begins with a high level description of systems, methods and computer program products according to embodiments of the present invention. An intermediate level description then will be provided, followed by a low level description.

High Level Description

Figure 2:
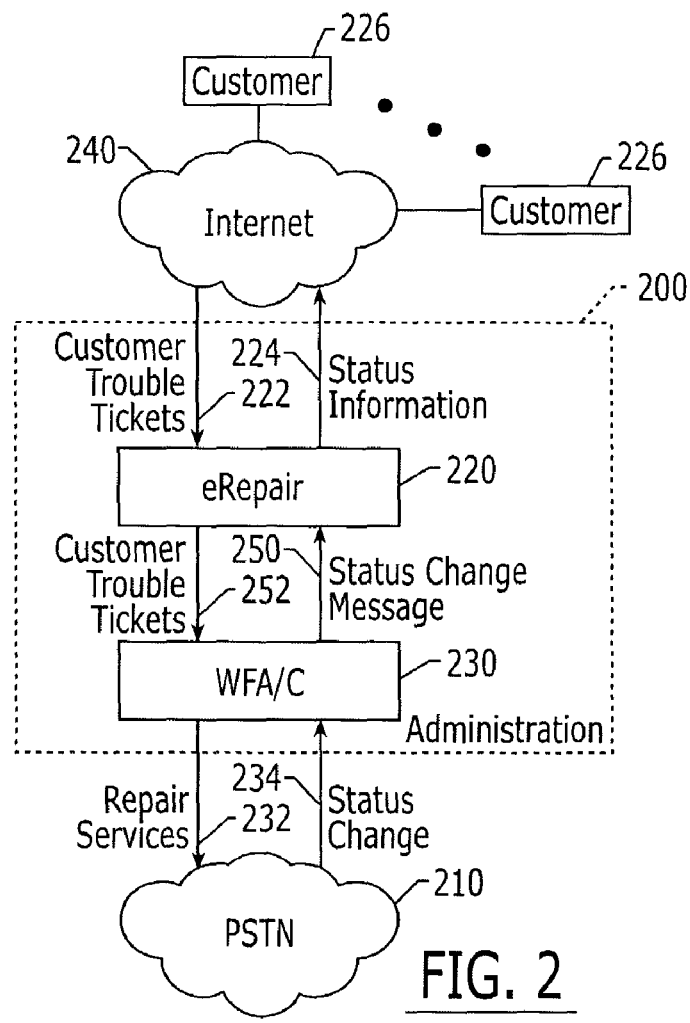
FIGS. 2–4 are high level block diagrams of systems, methods and computer program products for administering a PSTN according to embodiments of the present invention.

FIG. 2 is a block diagram of systems, methods and computer program products for administering a PSTN according to embodiments of the present invention. Referring now to FIG. 2, administration systems, methods and/or computer program products 200 according to embodiments of the present invention may be used with a PSTN 210. As shown in FIG. 2, these administration systems, methods and/or computer program products 200 include a network-based eRepair subsystem 220 that is configured to accept customer trouble tickets 222 related to the PSTN 210 via a network, such as the Internet 240, and to provide customer ticket status information 224 to customers 226 via the Internet 240. It will be understood that, as used herein, a customer includes any entity that is authorized to generate a trouble ticket, including internal and external customers. A Work Force and Administration-Control (WFA/C) subsystem 230 is configured to manage repair services 232 that are performed on the PSTN 210 in response to the customer trouble tickets 252. Moreover, the WFA/C subsystem 230 is also configured to automatically push a status change message 250 to the eRepair subsystem 220 upon occurrence of a status change 234 of a customer trouble ticket, for example, as a result of repair services 232 that are performed on the PSTN 210. The eRepair subsystem 220 is further configured to update the customer trouble ticket status information 224 in response to receipt of the status change message 250.

As also shown in FIG. 2, the eRepair subsystem 220 may be further configured to allow access by customers 226, via a network such as the Internet 240, to the customer trouble ticket status that is updated. The eRepair system 220 may be further configured to inform the customers 226, via the network such as Internet 240, that the customer trouble ticket status has been updated. In some embodiments, an email may be sent to inform the customer 226 that the customer trouble ticket status has been updated. In other embodiments, the customer 226 may be allowed to log on to the eRepair subsystem 220 to monitor the status of all or selected trouble tickets belonging to the customer 226. In still other embodiments, the WFA/C subsystem 230 is further configured to allow selection by an operator of the PSTN 210 and/or by a customer 226 of the change in status and/or the customer trouble ticket for which a status change message 250 is automatically sent to the eRepair subsystem 220. Thus, an operator of the PSTN 210 and/or a customer 226 may preselect a set of specific status changes and/or trouble tickets that should be pushed to the eRepair subsystem 220.

In still other embodiments of the invention, the WFA/C subsystem 230 is further configured to automatically push a status change message 250 to the eRepair subsystem 220 upon occurrence of a change in the status of a customer trouble ticket 252, for example, as a result of repair services that are performed on the PSTN 210, and without being polled periodically to identify open customer trouble tickets. Finally, in other embodiments of the invention, the WFA/C subsystem is further configured to automatically send a completion message to the eRepair subsystem 220 upon completion of a customer trouble ticket as a result of repair services that are performed on the PSTN 210. The completion message may be a type of status change message including a status that signifies completion, or a separate type of message.

Figure 3:
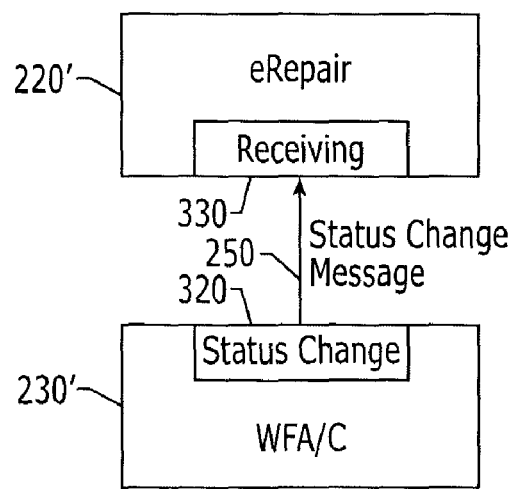

Embodiments of the present invention that were described in FIG. 2 incorporate the status change message push functionality within the WFA/C subsystem 230, and incorporate the functionality of receiving the status change message and updating the customer trouble ticket status information within the eRepair subsystem 220. In other embodiments of the present invention, as shown in the block diagram of FIG. 3, the proactive status message may be provided by a separate status change module 320, also referred to as an eRepair proactive status push module, that is contained within a modified WFA/C subsystem 230' and that is configured to automatically push a status change message 250 to the eRepair subsystem upon occurrence of a change in the status of a customer trouble ticket in the WFA/C subsystem 230', for example, as a result of repair services that are performed on the PSTN. Moreover, a receiving module 330 may be provided as part of a modified eRepair subsystem 220'. The receiving module 330 is configured to receive the status change message 250 and to update the customer trouble ticket status information in response to receipt of the status change message 250.

Figure 4:
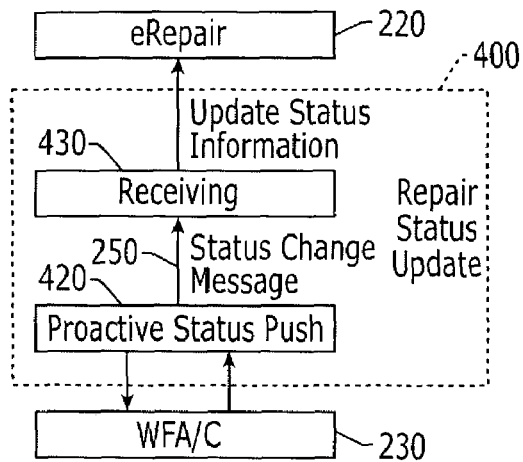

Moreover, in still other embodiments, as shown in FIG. 4, the functionality of proactive status push and receiving a status change message may be provided as a separate repair status update system 400 for an administration system for a PSTN, wherein the administration system includes an eRepair subsystem 220 and a WFA/C subsystem 230. The repair status update system 400 includes a proactive status push module 420 that is configured to automatically push a status change message 250 to the eRepair subsystem 220 upon occurrence of the change in a status of a customer trouble ticket in the WFA/C subsystem 230, for example, as a result of repair services that are performed on the PSTN. A receiving module 430 is configured to receive the status change message 250 and to update the customer trouble ticket status information in response to receipt of the status change message 250. It will be understood that in other embodiments, a portion of the proactive status push functionality may be provided within WFA/C and a portion of the proactive status push functionality may be provided outside WFA/C. Similarly, a portion of the receiving functionality may be provided within eRepair, and a portion of the receiving functionality may be provided outside eRepair.

Figure 5:
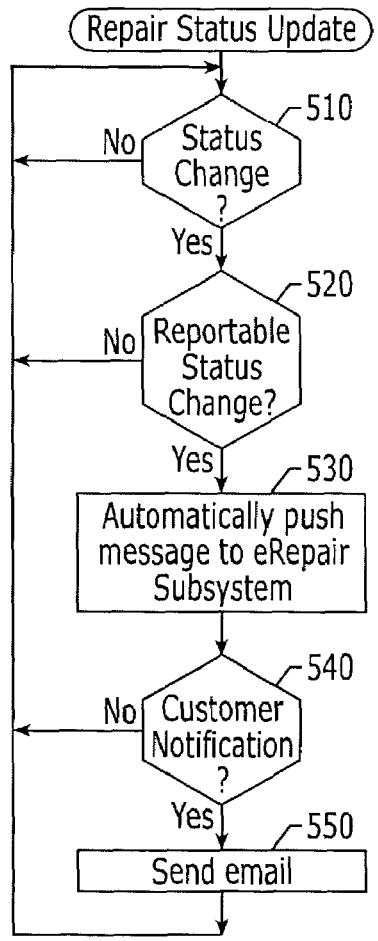
FIG. 5 is a flowchart of operations for repair status update according to embodiments of the present invention.

FIG. 5 is a flowchart of operations that can provide repair status updates according to some embodiments of the present invention. These operations may be performed, for example, by administration systems, methods and/or computer program products 200 of FIG. 2, by a status change module 320 and a receiving module 330 of FIG. 3, and/or by a repair status update system, method and computer program product 400 of FIG. 4.

In particular, as shown in FIG. 5, upon occurrence of a status change at Block 510, a test is made at Block 520 as to whether a reportable status change is present. In particular, as was described above, the network operator and/or customer may specify that only certain status changes and/or only certain customer trouble tickets need to be reported. If a reportable status change is present at Block 520, then at Block 530 a status change message is automatically pushed to the eRepair subsystem. As was described above, the customer may be allowed to log on to the eRepair system at any time, to obtain a snapshot of the current status of all or selected trouble tickets. Moreover, in some embodiments, as shown at Block 540, the customer may specify customer notification of the status. If this is the case, then at Block 550, an email may be sent to the customer, notifying of the change in status.

Intermediate Level Description

Figure 6:
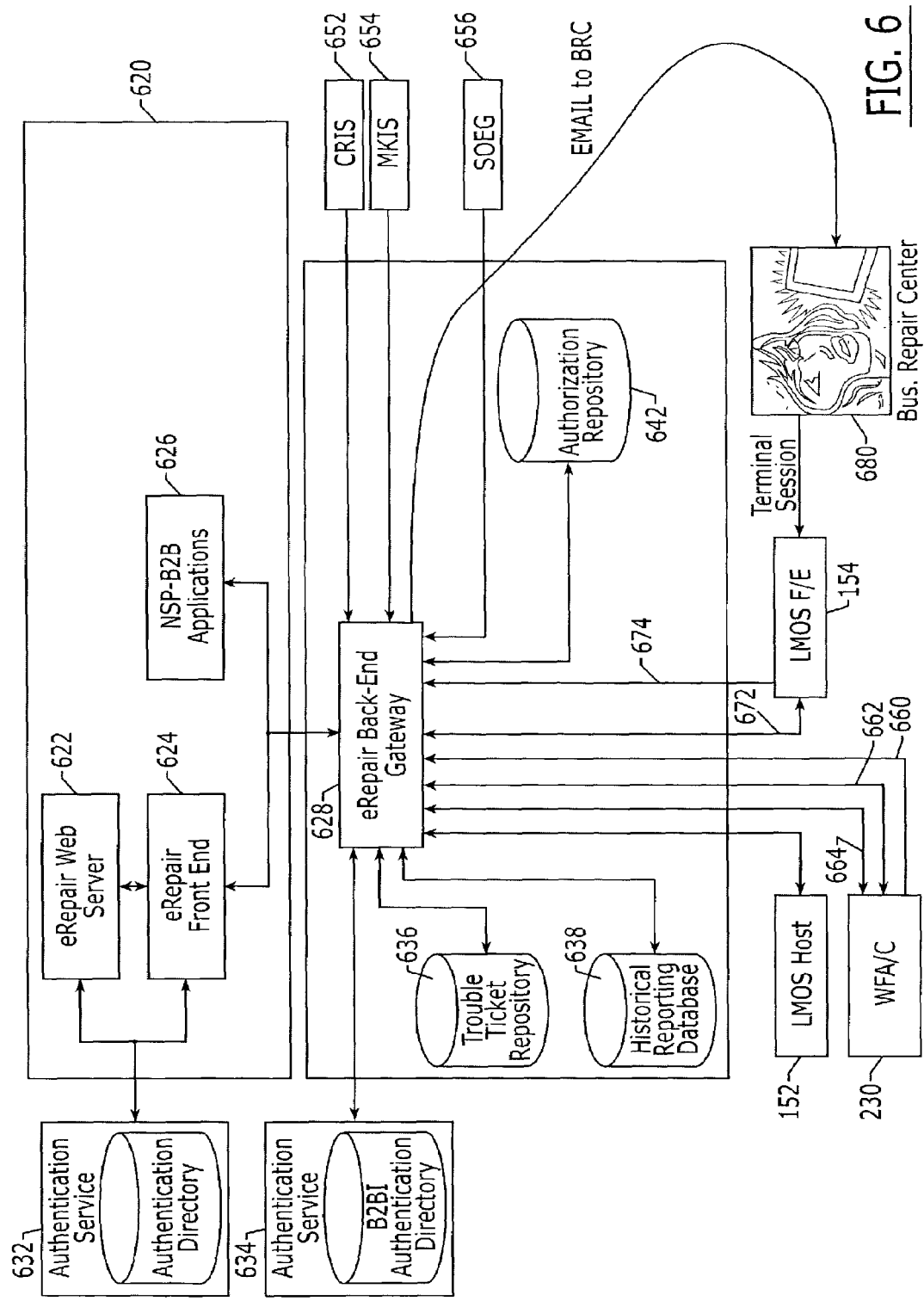
FIGS. 6–7 are intermediate level block diagrams of administration systems, methods and computer program products according to embodiments of the present invention.

FIG. 6 is a block diagram of administration systems, methods and computer program products for a PSTN including repair status update systems, methods and computer program products according to some embodiments of the invention. As shown in FIG. 6, a front end 620 includes an eRepair web server 622 and an eRepair front end 624. The eRepair web server 622 and the eRepair front end 624 may be provided as part of a PSTN operator's internal operations. Moreover, the front end 620 also can include Network Service Provider (NSP) business-to-business (B2B) applications 626 that may be designed and/or maintained by a third party that is not related to a network operator. For example, an Internet service provider may provide its own electronic repair subsystem that is configured to accept customer trouble tickets related to the circuits that it provides to a customer, and to provide customer trouble ticket status information to its customers. Accordingly, as used herein, the term "eRepair" shall not be limited to a network operator's systems, methods and computer program products that are configured to accept customer trouble tickets related to the PSTN and to provide customer trouble ticket status information to customers via a network, such as the Internet, but rather shall also include non-PSTN operators' Internet-based repair systems, methods and computer program products that are configured to accept customer trouble tickets related to the PSTN via a network, such as the Internet and to provide customer trouble ticket status information to customers via the network.

Continuing with the description of FIG. 6, an authentication service 632, which can include an authentication directory, may be used to ensure that only authorized users are allowed to access the eRepair web server 622 and/or the eRepair front end 624. As also shown in FIG. 6, an eRepair back end gateway 628 also is included. The eRepair back end gateway 628 can interface with an authentication service 634 and a trouble ticket repository 636 which can store all the trouble tickets for eRepair customers. A historical reporting database 638 also may be provided for archival purposes.

The eRepair back end gateway 628 can interface with a plurality of other systems, methods and/or computer program products. In particular, as shown in FIG. 6, an authorization repository 642 includes authorization tables that indicate circuit ownership. Two views may be provided in some embodiments. In a first view, a table is provided that indicates a listing of all circuit IDs and that are owned by a particular customer. In the second view, a table of circuit IDs is provided with an identification of an associated customer that owns it. In order to build and update these relationships, for example on a daily basis, the eRepair back end gateway 628 may obtain information from Service Order Entry Gateway (SOEG) system 656. The information then is used to build the authorization tables for Network Service Provider (NSP) customers. An interface with a CRIS system 652 and a Marketing Information System (MkIS) 654 also may be provided, to allow the authorization tables to be built for large customers. A unidirectional interface 674 from the LMOS F/E system 154 to the eRepair back end gateway 628 may be provided to provide the eRepair back end gateway 628 ticket information, new tickets, existing tickets and status changes in batch mode. A bidirectional interface 672 between the eRepair back end gateway 628 and the LMOS F/E system 154 also may be provided to allow a trouble ticket detail to be obtained using a request/reply procedure that is performed synchronously. An interface may be provided between the eRepair back end gateway 628 and the LMOS host 152, to allow trouble ticket history to be obtained in a request/reply protocol that is performed synchronously. An interface also may be provided between the Service Order Entry Gateway (SOEG) system 656 and the eRepair back end gateway 628 to allow billing information to be provided for NSP customers in batch mode.

Still continuing with the description of FIG. 6, a first interface 664 may be provided between the eRepair back end gateway 628 and WFA/C 230, to allow trouble ticket entry into WFA/C using a request/reply protocol in a synchronous mode. A second interface 662 between WFA/C 230 and the eRepair back end gateway 628 may be used to obtain trouble ticket history in a request/reply protocol. Finally, according to embodiments of the invention, a third interface 660 is provided between WFA/C 230 and the eRepair back end gateway 628, to provide a pushed status change message, such as the status change message 250 of FIGS. 2–4, to the eRepair back end gateway 628 upon occurrence of a change in a status of a customer trouble ticket as the result of repair services that are performed on the PSTN. The eRepair back end gateway 628 also may be configured to provide an email to a Business Repair Center (BRC) 680 to indicate a trouble ticket that has been entered. This trouble ticket then may be entered into LMOS F/E 154 using a terminal session.

As shown in FIG. 6, only trouble tickets that contain a status change are sent to the eRepair back end gateway 628 by WFA/C 230 via the interface 660. Accordingly, embodiments of the invention can relieve the WFA/C system 230 of extensive polling (for example every 45 minutes), as well as the overhead of sending all open trouble tickets to the eRepair back end gateway 628. Moreover, the eRepair back end gateway 628 may be relieved of the massive amounts of processing that may be needed to determine whether the status of each open trouble ticket has changed. Instead, the eRepair back end gateway 628 only receives the trouble tickets which have changed. Finally, instead of waiting for a poll to take place every 45 minutes, the eRepair application can be immediately notified when the status of a particular trouble ticket has changed. More up to date information thereby may be provided to customers.

Figure 7:
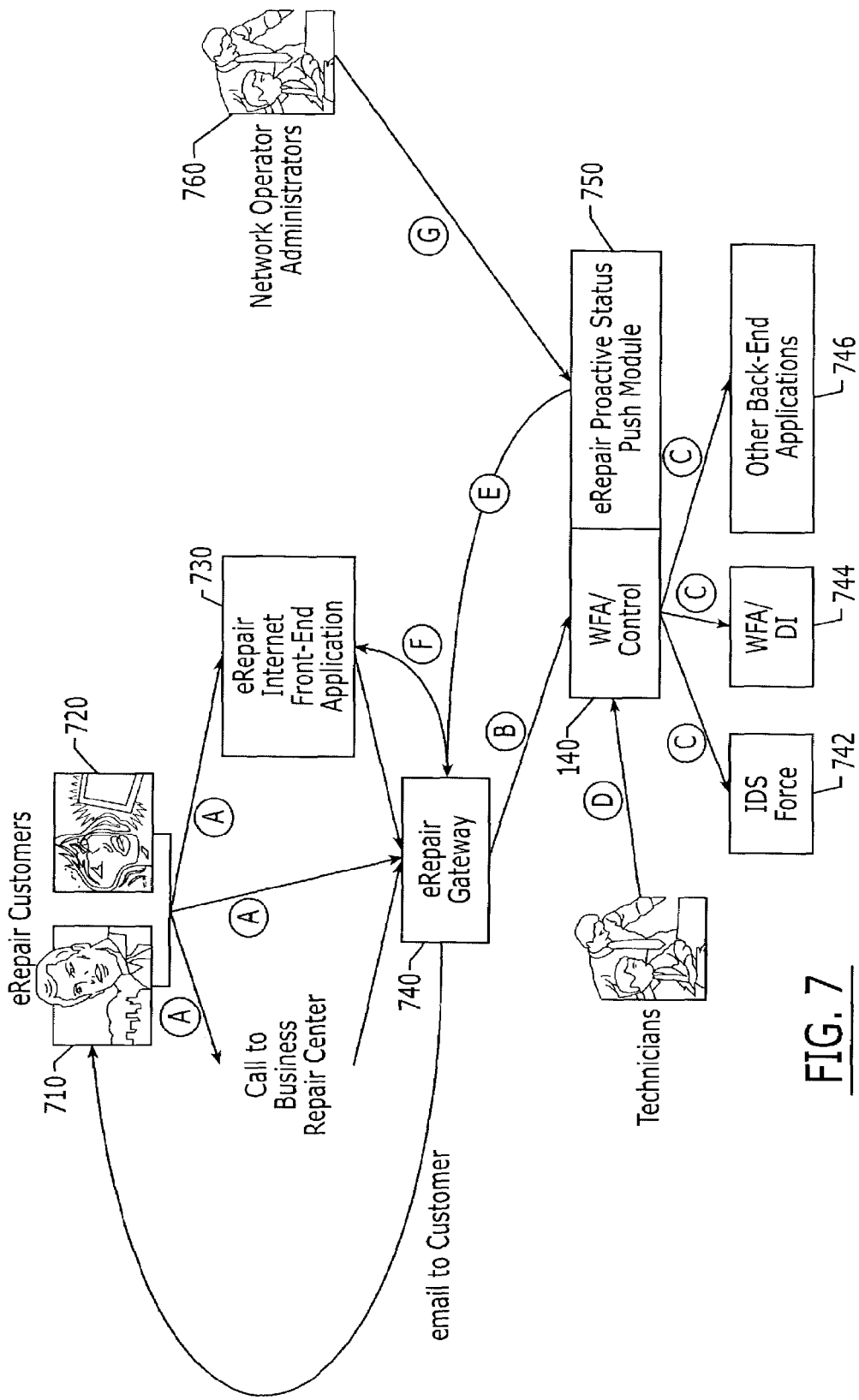

FIG. 7 is a block diagram of operational flow to provide proactive status change push messages according to some embodiments of the present invention. As shown at A, a customer 710 may call a business repair center 720, may enter a trouble ticket on an eRepair Internet front end application 730, which may correspond to an eRepair subsystem that has been described above, and/or may electronically submit the trouble ticket to the eRepair gateway 740, which may correspond to the eRepair gateway 628 of FIG. 6. The eRepair gateway 740 submits the trouble ticket to the WFA/C application 140 as shown at B. WFA/C 140 manages the trouble ticket, makes a determination regarding the type of trouble that the customer is having and routes the ticket to other appropriate applications, such as IDS force application 742 for outside dispatches, WFA/DI 744 for inside dispatches and/or other back end applications 746, as shown at C.

As network operator technicians work to resolve the trouble ticket, they can make electronic notations on the ticket and change the status of the ticket as shown at D. When these changes are made, the eRepair proactive status push module 750 detects the changes and sends notification to the eRepair gateway 740, as shown at E. Customers can then either check the status of their trouble tickets via the eRepair Internet front end application 730 as shown at F, and/or they may also select an option to be notified by email. Network operator administrators 760 may select the type of status changes to be pushed through a user-customized table which may be attached to WFA, as shown at G. Accordingly, an operator and/or a customer can select the change in status and/or the customer trouble ticket for which a message is automatically sent to the eRepair subsystem.

Figure 8:
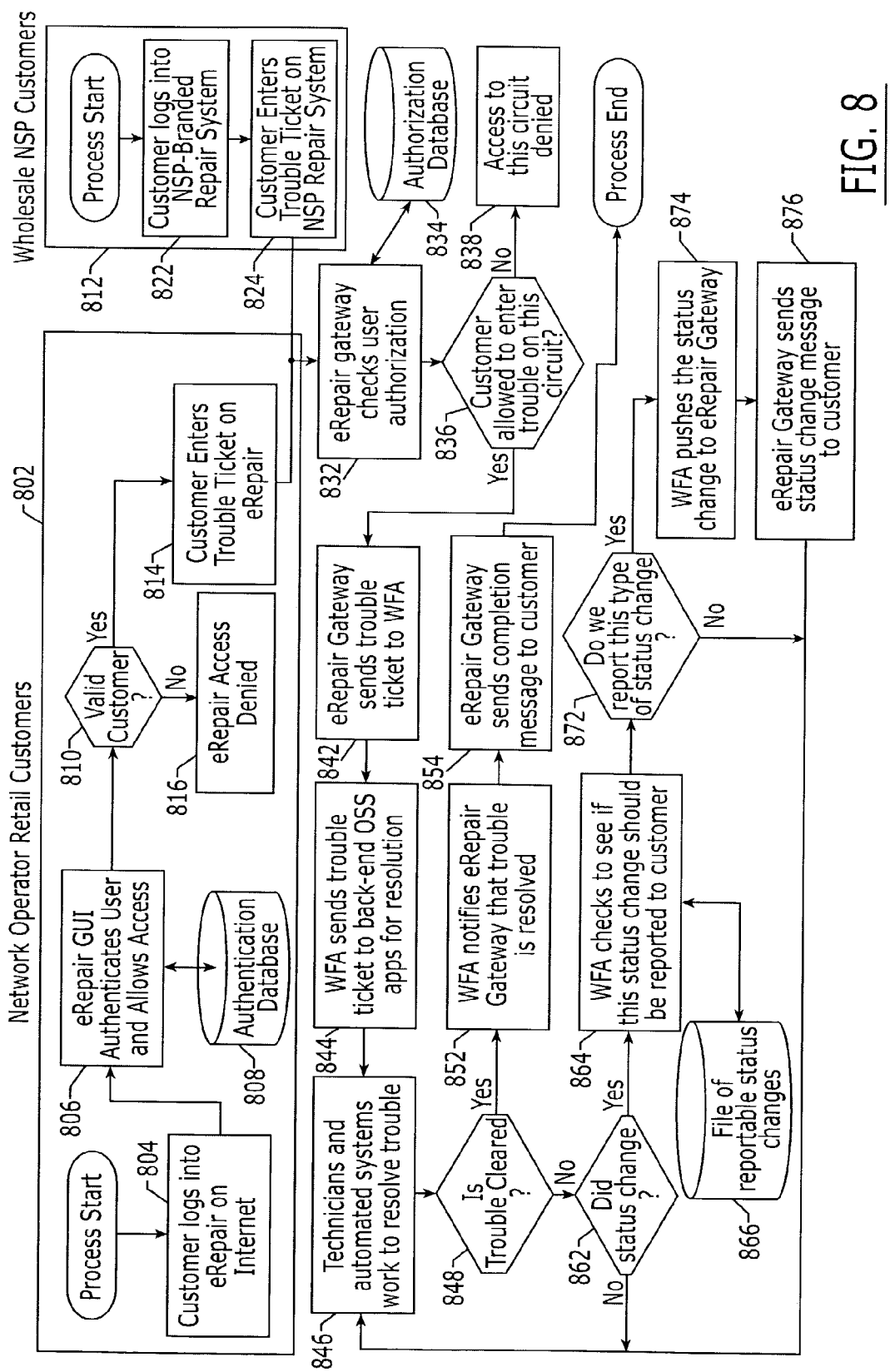
FIG. 8 is an intermediate level flowchart of operations that may be performed according to some embodiments of the present invention.

FIG. 8 is an intermediate level flowchart of operations that may be performed according to some embodiments of the present invention. As shown in FIG. 8, these operations may start at Block 802 by network operator retail customers, and/or may start by customers of other Network Service Provider (NSP) customers at Block 812. As shown in Block 802, a customer can log onto an eRepair system on the Internet at Block 804. An eRepair Graphical User Interface (GUI) can authenticate the user and allow access at Block 806 using an authentication database 808. If the customer is valid at Block 810, the customer can enter the trouble ticket on eRepair at Block 814, and if the customer is not a valid customer, eRepair access is denied at Block 816. An eRepair GUI that can allow authentication and entry of trouble tickets will be described in detail below.

Continuing with the description of FIG. 8, a NSP customer at Block 812 can log into an NSP-branded repair system at Block 822, and can enter a trouble ticket on the NSP-branded repair system at Block 824. Authentication procedures may also be provided in the NSP-branded repair system.

Still continuing with the description of FIG. 8, the trouble ticket that is entered on eRepair at Block 814 or Block 824 is processed by the eRepair gateway at Block 832, to check for user authorization using an authorization database 834. If the customer is not allowed to enter trouble on this circuit at Block 836, access to this circuit is denied at Block 838. Alternatively, if the customer is allowed to enter trouble on the circuit at Block 836, the eRepair gateway sends the trouble ticket to WFA at Block 842 and WFA sends the trouble ticket to the back end Operational Support Systems (OSS) for resolution at Block 844. At Block 846, technicians and/or automated systems work to resolve the trouble. At Block 848, if the trouble is cleared, then at Block 852 WFA notifies the eRepair gateway that the trouble is resolved, and at Block 854 the eRepair gateway sends a completion message to the customer.

Alternatively, if the trouble is not yet cleared at Block 848, according to embodiments of the present invention, a test is made at Block 862 as to whether the status changed. If the status changed, then at Block 864, WFA checks to see if this status change should be reported to the customer using a file of reportable status changes (Block 866). If this type of status change is reportable at Block 872, then at Block 874 WFA pushes the status change to the eRepair gateway, and the eRepair gateway sends a status change message to the customer at Block 876. Alternatively, the message need not be sent to the customer but, rather, the customer can be informed of the status change upon logging on to the eRepair subsystem and checking the status of that trouble ticket.

Low Level Description

Figure 9:
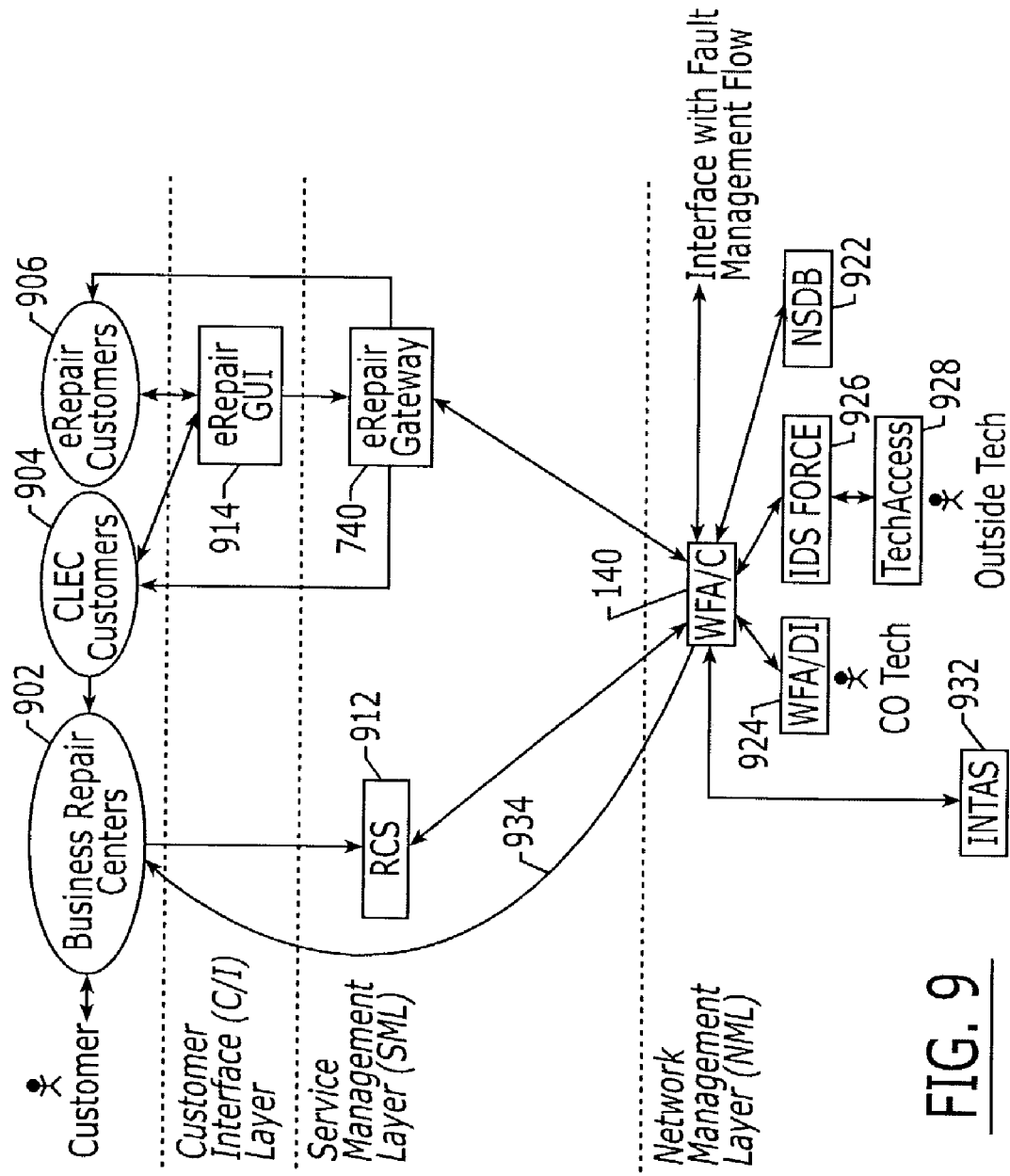
FIGS. 9–10 are detailed flow diagrams of customer initiated trouble flows according to some embodiments of the present invention.

FIG. 9 is a detailed flow diagram of customer-initiated trouble flows according to some embodiments of the present invention. This flow diagram is defined in terms of a conventional Telecommunications Management Network (TMN) architecture, including a Customer Interface (C/I) layer, a Service Management Layer (SML), a Network Management Layer (NML) and a Network Element Layer (NEL). The TMN architecture is well known to those having skill in the art and need not be described further herein. Moreover, FIG. 9 is described in connection with design circuit trouble flow, wherein a design circuit indicates a special service line, such as a data line including but not limited to well known T1, T3, OC1, OC3, ISDN, ADSL and/or other data lines. However, it will be understood that this process flow, and all other embodiments of the present invention, may be used with Plain Old Telephone Service (POTS) circuits as well.

Referring now to FIG. 9, customer-initiated design circuit trouble flow may be initiated by a customer as shown in Blocks 902, 904 and/or 906. In particular, at Block 902, the customer may contact the Business Repair Center at Block 902 by telephone. Competitive Location Exchange Carrier (CLEC) customers can also contact the Business Repair Center 902. Finally, at Block 906, eRepair customers, who are customers who subscribe to an eRepair subsystem, may also initiate the trouble flow process. In some embodiments, eRepair may be used by a network operator's largest customers, to allow them to enter trouble tickets via the Internet. However, eRepair subsystems also may be used by all customers on a free and/or subscription basis, and also may be used by customers of companies who are not network operators but who provide some circuit capability on the PSTN.

Still referring to FIG. 9, a Revision Control System (RCS) system 912 allows the Business Repair Centers 902 to view customer records across multiple physical instances of WFA/C 140. The eRepair GUI 914 captures trouble ticket information from eRepair subscribers and sends this information to the eRepair gateway 740. Thus, the trouble ticket may be sent to WFA/C 140 from the RCS system 912 and/or from the eRepair gateway 740. WFA/C 140 sends a request to the Network Security DataBase (NSDB) 922, to obtain line record data. A line test request is made to the INTAS system 932 for line record data and WFA/C 140 makes a determination as to whether an inside dispatch or an outside dispatch is required. A line test is requested from WFA/C 140 to loop care system (INTAS) 932 if the trouble did not originate in Trouble Analysis Facilitation Interface (TAFI), and the results are returned. Then, if the ticket requires an inside dispatch, a trouble ticket is sent by WFA/C 140 to WFA/DI 924. WFA/DI 924 builds a work request and the technician clears the trouble. Status changes are sent back to WFA/C 140 from WFA/DI 924.

Still continuing with the description of FIG. 9, if the trouble ticket requires an outside dispatch, then WFA/C 140 sends the trouble ticket to the IDS Force system 926, where a work request is built. Status changes are sent back to WFA/C 140. The IDS Force system 926 sends work request details and dispatch information to the technician via the TechAccess system 928, and the technician clears the trouble. The technician sends a completion record from the TechAccess system 928 to the IDS Force system 926. The IDS Force system 926 closes the work request and sends the completion message to WFA/C 140. Also, WFA/DI 924 closes the work request and sends the completion message back to WFA/C 140.

Finally, completions flow back to the originating application or the customer as follows: If the trouble ticket originated from a Business Repair Center 902, then WFA/C builds a completion queue, which allows a technician to inform the customer that the problem has been corrected. This completion queue is then sent to the Business Repair Center 902 as shown by interface 934. Finally, if a ticket originated within eRepair, then WFA/C 140 sends a completion message to the eRepair gateway 740. The eRepair customers 906 and/or the CLEC customers 904 are notified via email of completion and/or upon log in to eRepair.

Figure 10:
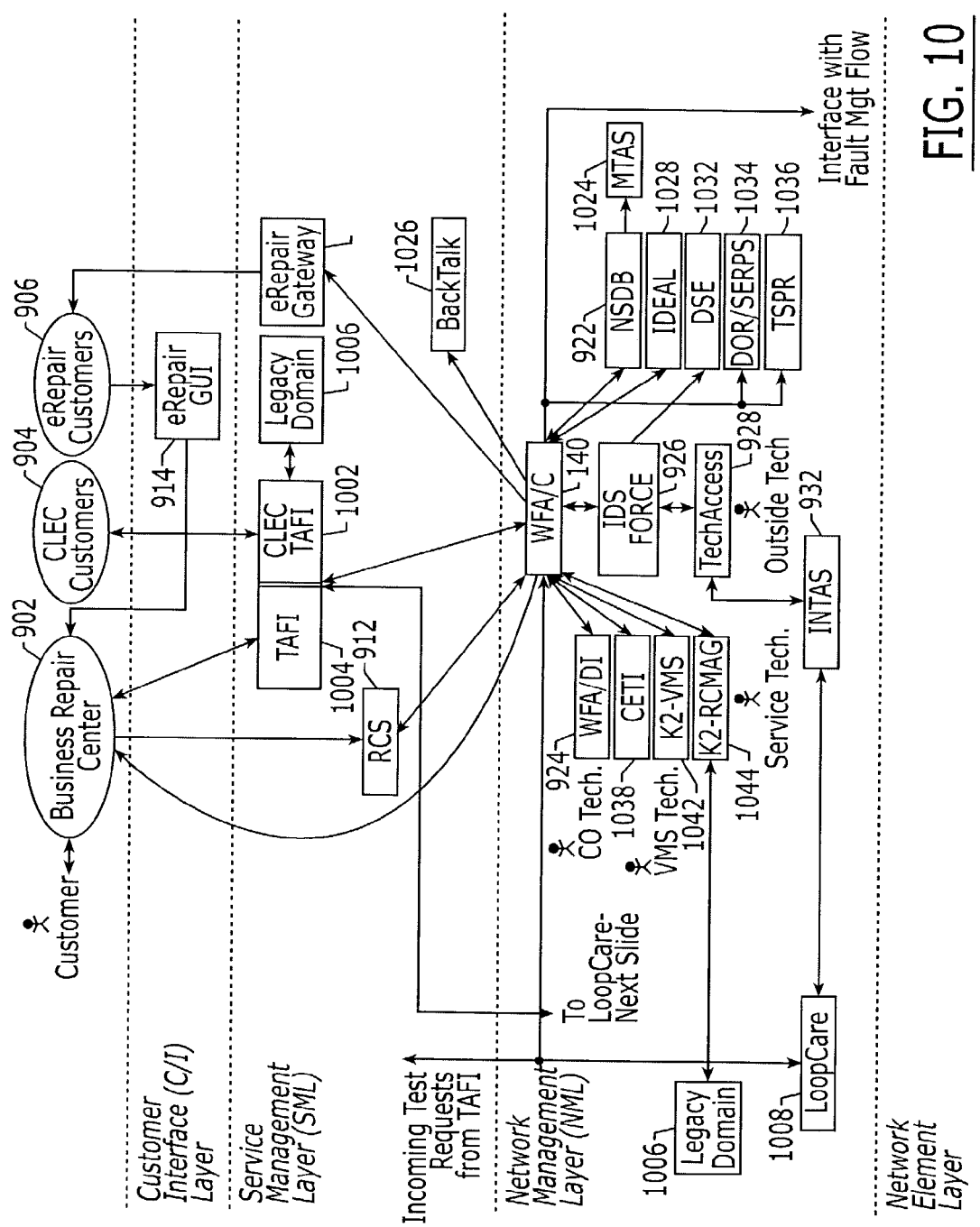

FIG. 10 is a flowchart of customer-initiated POTS circuit trouble flow according to some embodiments of the present invention. Since there may be many more POTS lines than design circuits, and since many of these POTS lines are retail customer lines, added functionality may be provided in FIG. 10 to allow trouble analysis screening, which can eliminate problems before they become a trouble ticket, and thereby reduce the number of actual trouble tickets. It also will be understood that embodiments of FIG. 10 may be used with design circuits and/or other circuits.

As shown in FIG. 10, in first operations, the customer connects to an externally facing system and/or contacts a network operator by phone to begin the trouble ticket entry process. Externally-facing ticketing applications shown in FIG. 10 include EC-TA, which is a trouble management gateway for electronic bonding with inter-exchange customers, and which communicates to customers using ECIC standard communication protocol, eRepair 2.0 914, which can allow customers to enter trouble tickets via the Internet, CLEC TAFI 1002, which allows CLEC customers to enter and prescreen POTS trouble tickets, TAFI 1004, which allows network operator Business Repair Centers 902 to enter and prescreen POTS trouble tickets, and RCS Block 912, which provides a mechanism for customer repair centers to view customer records across multiple physical instances of WFA. POTS trouble tickets are emailed to the Business Repair Center 902 to be entered through TAFI 1004. Trouble information is entered into TAFI for prescreening, which may result in either a resolution prior to trouble ticket creation or in creation of an actual trouble ticket.

Prescreening by TAFI 1004 can interface with several legacy applications shown collectively as a Legacy Domain 1006. Prescreening can include the following functionality: checking CRIS to see if the customer is being billed for the service they are reporting as inoperable; performing a line test if the customer is reporting no dial tone; checking the switch translations to make sure that the service the customer is reporting has been activated; determining whether the problem is related to customer premises equipment; making sure that the customer knows how to use the feature they are reporting; checking to make sure there is not a pending service order or trouble ticket for the circuit being reported; and/or determining whether the circuit being reported has been ported out to another provider. As part of this prescreening, a line test may be requested from TAFI 1004 to LoopCare 1008, and the test results may be returned. If TAFI Block 1004 can resolve the trouble initially, the trouble is cleared before a trouble ticket is created. Notification is then sent back to the Business Repair Center 902.

On the other hand, if actual trouble is detected, then the trouble ticket is sent by TAFI 1004 and/or RCS 912 to WFA/C 140. WFA/C 140 provides trouble ticket management sequence and control, as well as trouble tracking and status. In particular, as shown in FIG. 10, WFA/C 140 sends a request to NSDB 922 for line record data. NSDB 922 serves as a database for WFA/C and contains customer and circuit data. Also, a line test may be requested from WFA to LoopCare 1008 if trouble did not originate in TAFI and the results are returned. If WFA/C 140 or TAFI 1004 (if the ticket originated in TAFI) determine that an inside dispatch is required, WFA/C 140 sends the trouble ticket to WFA/DI 924, where a work request is built. Status changes are sent back to WFA/C 140 via status change push passages.

If the trouble description indicates that the trouble is LD/carrier based, WFA/C 140 sends the trouble to the carrier via CETI 1038. CETI is an application that is used to send trouble tickets to IXCs. Alternatively, if the trouble description indicates that the trouble is related to voice mail or memory call, WFA/C sends the trouble ticket to K2-VMS 1042. K2-VMS is an application that may be used to manage voice mail applications. Status change messages and completion message flow back to WFA/C 140. In another alternative, if the Business Repair Center 902 or TAFI 1004 determines that the trouble is related to the switch or the switch translations, WFA/C 140 sends the trouble to K2-RC-MAG 1044. K2 is a work management and reporting system used by Recent Change Memory Administration Group (RCMAG) to collect, store and prioritize the manual work that must be completed by the RCMAG. K2-RCMAG 1044 interfaces with the Legacy Domain 1006 depending on the type of trouble in order to correct the switch trouble. Status change messages and completion messages flow back to WFA/C 140.

In yet another alternative, if the Business Repair Center 902 or TAFI 1004 determines that an outside dispatch is required, WFA/C 140 sends the trouble ticket to IDS Force 926, where a work request is built. Status change messages are sent back to WFA/C 140. IDS Force 926 sends work request details and dispatch information to the technician via TechAccess 928. Technicians request loop tests via TechAccess 928 through INTAS 932, to make sure that the problem still exists before they start the work, and to test the line following completion of their job. The loop test is requested from INTAS 932 to LoopCare 1008 and the test results are returned. The technician completes the work and retests the line. After ensuring that the circuit test is OK, the technician enters completion data in TechAccess 928, and TechAccess 928 sends the completion record to IDS Force 926. IDS Force 926 closes the work request and sends a completion message to WFA/C 140. WFA/C 140 sends a completion message to NSDB 922, where the line record is updated.

In FIG. 10, completions flow back to the originating application or to the customer as follows: if the line is residential, WFA/C 140 sends completion information to BackTalk 1026 for customer notification. Alternatively, if the trouble ticket was on a business POTS line, WFA/C 140 builds a completion queue which allows the technician to inform the customer that the problem has been corrected. If the ticket originated from EC-TA, WFA/C 140 sends a completion message to EC-TA for notification of IXCs. Finally, if the ticket originated within eRepair 914, then WFA/C 140 sends a completion message to the eRepair gateway. The eRepair customers are notified via email of completion and/or are notified by checking the status of their outstanding trouble tickets.

Finally, FIG. 10 also illustrates a number of reporting and status applications that may be used in the Network Management Layer. These include Mechanized Trouble Analysis System (MTAS) 1024, which provides reporting and measurement data to the FCC, PSCs and internal users; Integrated Database for Engineering Activity Logs (IDEAL) 1028, which provides reporting related to work requests and responses to work requests; Dispatch System Enhancement (DSE) 1032, which provides status on current (outstanding) troubles and their related circuits; DOR/SERPS 1034, which is used, housed and maintained by the WFA/C 140 to track performance; and Telecommunications Service Priority Reconciliation (TSPR) 1036, which allows tracking and reporting of trouble tickets which are critical to national security.

Figure 11A:
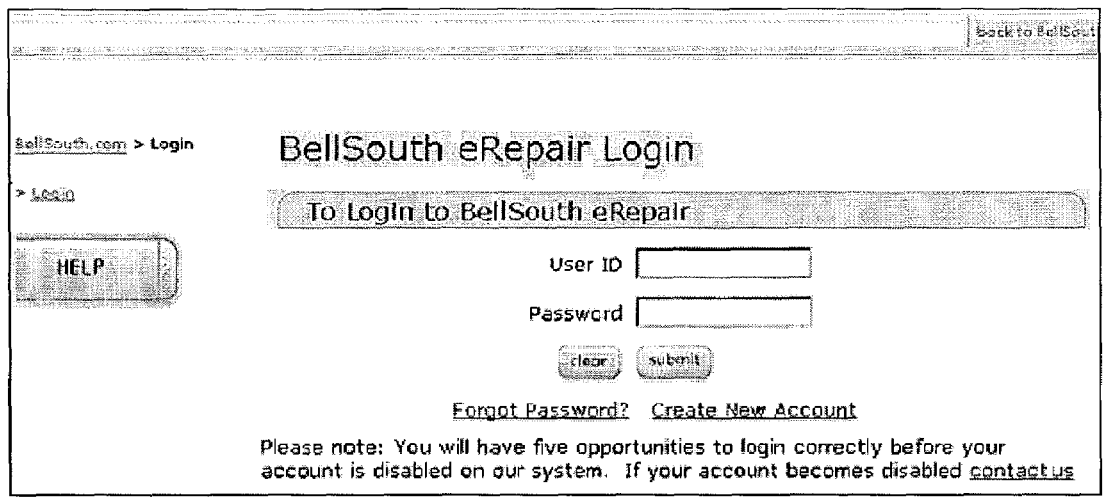
Figure 11B:
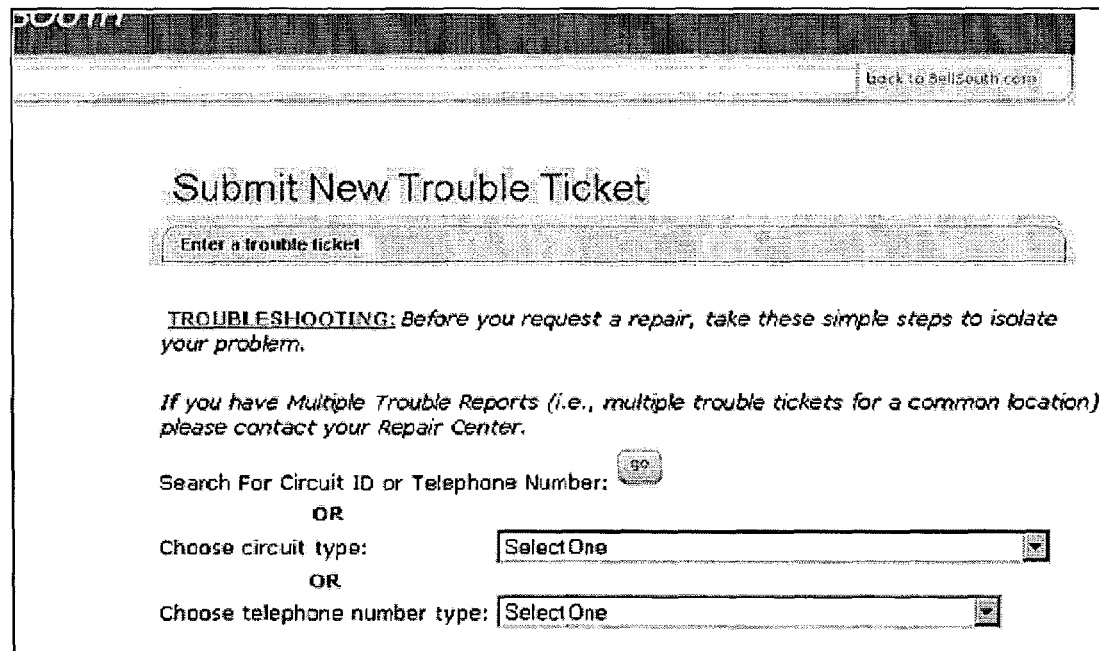
Figure 11C:
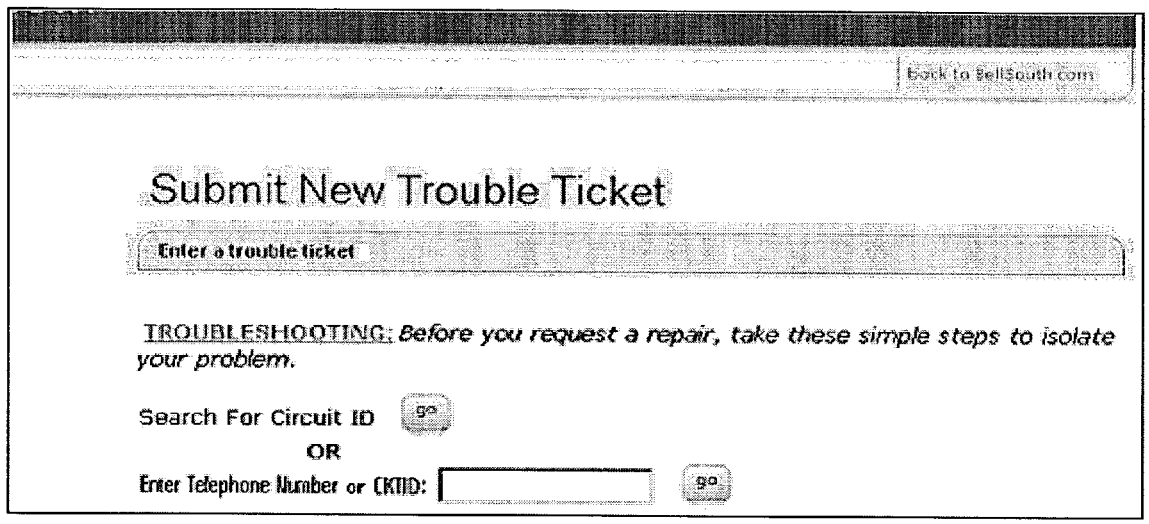
Figure 11E:

FIGS. 11A–11K are screen shots of a graphical user interfaces (GUI) that may be used in various embodiments of the present invention. In particular, FIG. 11A illustrates a login screen that may be used, for example, at Block 804. FIGS. 11B–11D illustrate submitting of a new trouble ticket, for example, as was described at Block 814, and FIG. 11E illustrates a screen that may be received upon successful creation of a trouble ticket.

Figure 11F:
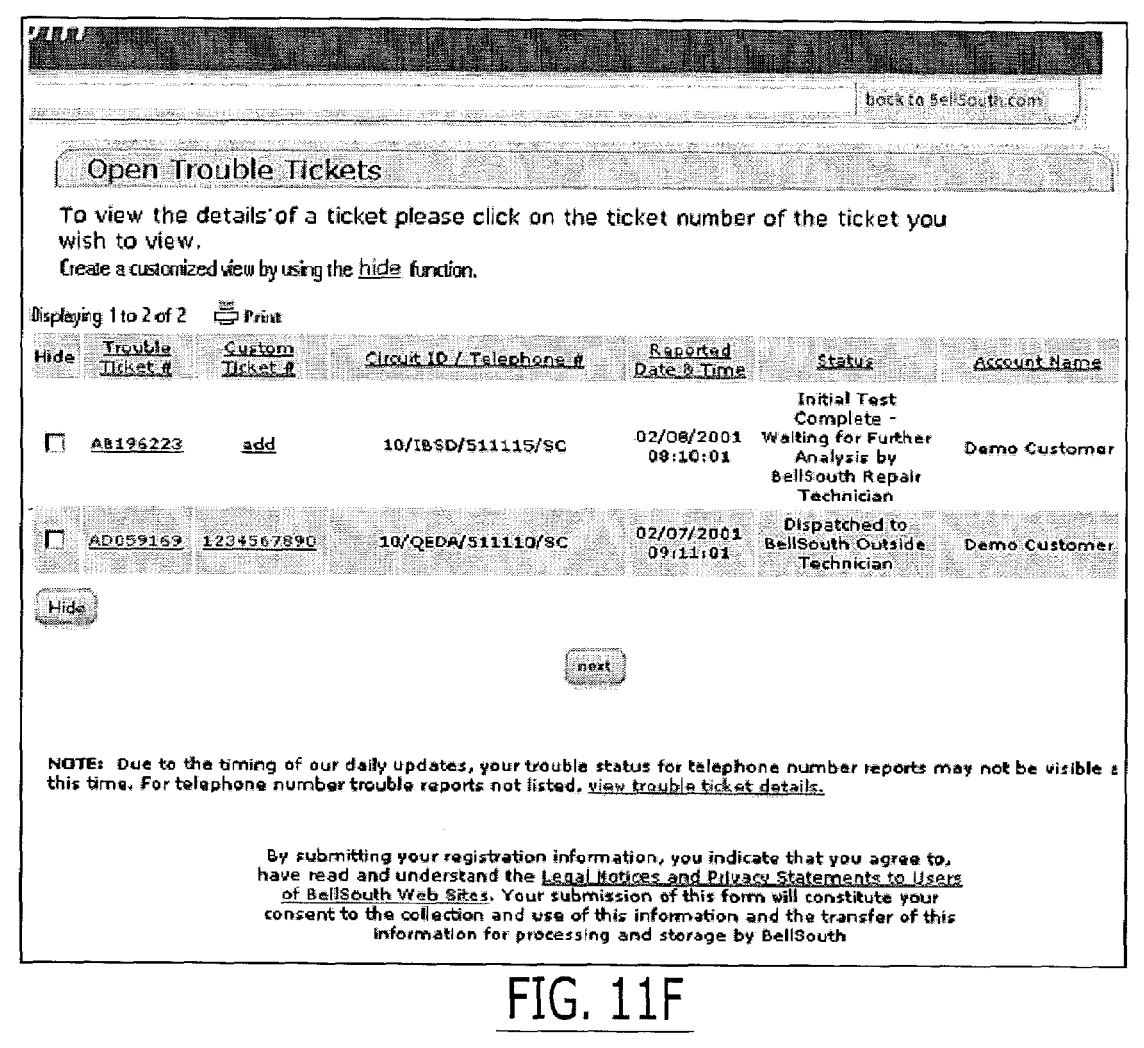
Figure 11K:
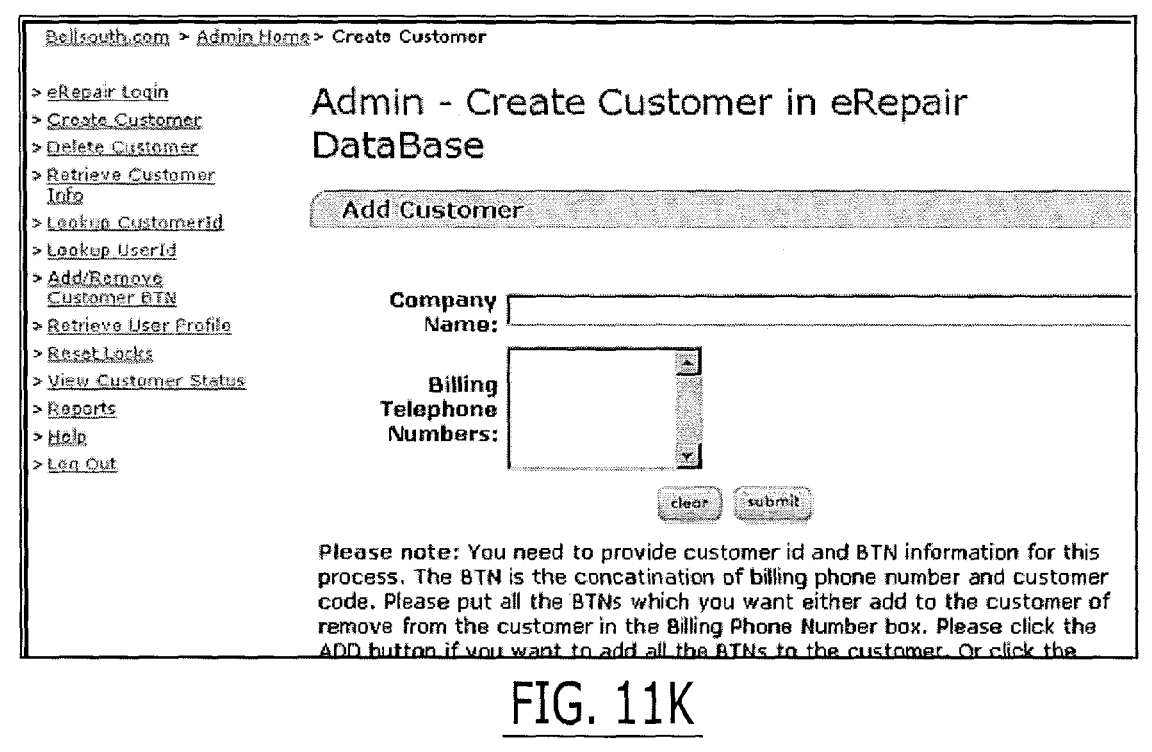

FIG. 11F illustrates a screen that may be used to view open trouble tickets, for example, at an eRepair front end application 730, to determine the status of these tickets. FIG. 11G illustrates another option for tracking trouble reports using a custom ticket number. FIGS. 11H and 11I illustrate the status information that may be seen when viewing a trouble ticket. FIG. 11J illustrates a user profile that may be entered by a customer and which can indicate the customer's preferences for receiving status messages by email. FIG. 11K illustrates creation of a customer in an eRepair database which may be used by network operators, for example at Block 760.

FIGS. 12A–12C are examples of emails that may be sent by an eRepair system to customers to indicate a status update, as was described, for example, in Blocks 550 and 876.

The following Table provides an example of a format of a status change message 250 according to some embodiments of the present invention. The order in which the data items are displayed in the status change message is the same order as they appear in the table. In the message, a semicolon may be used as a delimiter between each data item. Moreover, if no data exists for a particular item, the file can contain a semicolon followed by spaces equal in number to the size of the field, followed by another semicolon. The data can line wrap from one line to the next.

TABLE

| Field Name | Length & Examples |
|---|---|
| Trouble Ticket Number = WFA TR# | 8 - (SV040861) |
| Circuit ID = WFA CKT ID | 46 - (P 536/041/2041) |
| Date | 8 - (04/16/02) |
| Time | 5 - (11:20) |
| WFA SYS TIME ZONE ID | 3 - (PDT) |
| Function Code = FCT | 5 - (LRCLD) |
| Access Carrier Name Abbreviation = ACNA | 4 - (ABC) |
| Master/Major Customer Number = MCN | 19 - (12345678) |
| Customer Carrier Name Abbreviation = CCNA | 4 - (DEF) |
| Account Name = N | 20 - (JOHN SMITH) |
| Report Category = RPTCAT | 2 - (CR) |
| Received Date Time = RECD (Reported Date and Time) | 6 + 4 - (042402 + 1600) |
| Account Address = N | 42 - 1234 MAIN) |
| Trouble Type = TYPE (Description of the original summary report) | 4 - (NDT) |
| Reported By = RPTD BY | 20 - (JOHN SMITH) |
| Carrier Contact Phone = TEL | 18 - (2017323600) |
| Resolved Time = CLRDATE&CLRTIME (Used on close) | 6 + 4 - (042402;1630) |
| Actual Restored Date and Time | 6 + 4 - (042402;1631) |
| Premise A location Name and Address = P1 | 20 + 42 (=PISCATAWAY + 1234 MAIN) |
| Premise Z location Name and Address = P2 | 20 + 42 - (PISCATAWAY + 1234 MAIN) |
| Reported Trouble (TRBL Found) = TRBL CD | 3 - (TOK) |
| Analysis Code = AN CD | 2 - (AN) |
| Service Address = SA | 42 - (1234 MAIN) |
| Service Name = SN | 20 - (JOHN SMITH) |
| Center = CTR | 11 - (PISCNJMTSSC) |
| Dispatch Center = DSP CTR | 11 - (PISCNJMTSSC) |
| Current Commitment Date/Time | 6 + 4 - (042402 + 1600) |
| ACCESS_FROM | 4 - (1200) |
| ACCESS_TO | 4 - (1600) |
| Special Study = SS | 4 - (NSYC) |
| Circuit Access Code = CAC | 8 - (NAC2LA6C) |
| Disposition Code = D | 4 - 1210 |
| Cause Code = C | 3 - (600) |
| Function Level Code = FLC | 3 - ABC |
| TOTAL | 489 |

FIG. 13 is an example of a status change message. This status change message uses the format of the above Table.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. An administration system for a Public Switched Telephone Network (PSTN) comprising:
   a network-based Repair (eRepair) subsystem that is configured to accept customer trouble tickets related to the PSTN via the network and to provide customer trouble ticket status information to customers via the network; and
   a Work Force and Administration-Control (WFA/C) subsystem that is configured to manage repair services that are performed on the PSTN in response to the customer trouble tickets and that is further configured to automatically push a status change message to the eRepair subsystem upon occurrence of a change in a status of a customer trouble ticket as a result of repair services that are performed on the PSTN and without being polled periodically to identify open customer trouble tickets;
   the eRepair subsystem being further configured to update the customer trouble ticket status information in response to receipt of the status change message.

2. A system according to claim 1 wherein the eRepair subsystem is further configured to allow customer access, to the customer trouble ticket status that is updated.

3. A system according to claim 1 wherein the eRepair subsystem is further configured to inform the customer, via electronic mail (email), that the customer trouble ticket status has been updated.

4. A system according to claim 1 wherein the WFA/C subsystem is further configured to allow selection by an operator of the PSTN and/or by a customer, of the change in status and/or the customer trouble ticket for which a status change message is automatically pushed to the eRepair subsystem.

5. A system according to claim 1 wherein the WFA/C subsystem is further configured to automatically send a completion message to the eRepair subsystem upon completion of a customer trouble ticket as a result of repair services that are performed on the PSTN.

6. A repair status update system for an administration system for a Public Switched Telephone Network (PSTN), the administration system comprising a network-based Repair (eRepair) subsystem that is configured to accept customer trouble tickets related to the PSTN via the network and to provide customer trouble ticket status information to customers via the network and a Work Force and Administration-Control (WFA/C) subsystem that is configured to manage repair services that are performed on the PSTN in response to the trouble tickets, the repair status update system comprising:
   an eRepair Proactive Status Push Module that is configured to automatically push a status change message to the eRepair subsystem upon occurrence of a change in a status of a customer trouble ticket in the WFA/C subsystem as a result of repair services that are performed on the PSTN and without being polled periodically to identify open customer trouble tickets.

7. A system according to claim 6 further comprising:
   a receiving module that is configured to receive the status change message and to update the customer trouble ticket status information in response to receipt of the status change message.

8. A system according to claim 6 wherein the eRepair Proactive Status Push Module is further configured to allow selection by an operator of the PSTN and/or by a customer, of the change in status and/or the customer trouble ticket for which a status change message is automatically sent to the eRepair subsystem.

9. An administration system for a Public Switched Telephone Network (PSTN) comprising:
   means for accepting customer trouble tickets related to the PSTN via a network;
   means for providing customer trouble ticket status information to customers via the network;
   means for managing repair services that are performed on the PSTN in response to the customer trouble tickets;
   means for automatically pushing a status change message to the means for providing upon occurrence of a change in a status of a customer trouble ticket as a result of repair services that are performed on the PSTN and without being polled periodically to identify open customer trouble tickets; and
   means for updating the customer trouble ticket status information in response to receipt of the status change message at the means for providing.

10. A system according to claim 9 wherein the means for providing comprises means for allowing customer access, via the network, to the customer trouble ticket status that is updated.

11. A system according to claim 9 wherein the means for providing comprises means for sending electronic mail (email), that the customer trouble ticket status has been updated.

12. A system according to claim 9 further comprising means for allowing selection by an operator of the PSTN and/or by a customer, of the change in status and/or the customer trouble ticket for which a status change message is automatically pushed to the means for providing.

13. A system according to claim 9 further comprising means for automatically sending a completion message to the means for providing upon completion of a customer trouble ticket as a result of repair services that are performed on the PSTN.

14. A repair status update system for an administration system for a Public Switched Telephone Network (PSTN), the administration system comprising means for accepting customer trouble tickets related to the PSTN via a network, means for providing customer trouble ticket status information to customers via the network and means for managing repair services that are performed on the PSTN in response to the trouble tickets, the repair status update system comprising:
   means for automatically pushing a status change message to the means for providing upon occurrence of a change in a status of a customer trouble ticket in the means for managing as a result of repair services that are performed on the PSTN and without being polled periodically to identify open customer trouble tickets.

15. A system according to claim 14 wherein the repair status update system further comprises:
   means for receiving the status change message and for updating the customer trouble ticket status information in response to receipt of the status change message.

16. A system according to claim 14 wherein the repair status update system further comprises means for allowing selection by an operator of the PSTN and/or by a customer, of the change in status and/or the customer trouble ticket for which a status change message is automatically pushed to the means for providing.

17. A computer program product that is configured to administer a Public Switched Telephone Network (PSTN), the computer program product comprising computer usable storage medium having computer-readable program code embodied in the medium, the computer-readable program code comprising:

computer-readable program code that is configured to accept customer trouble tickets related to the PSTN via a network and to provide customer trouble ticket status information to customers via the network; and computer-readable program code that is configured to manage repair services that are performed on the PSTN in response to the customer trouble tickets and that is further configured to automatically push a status change message to the computer-readable program code that is configured to accept upon occurrence of a change in a status of a customer trouble ticket as a result of repair services that are performed on the PSTN and without being polled periodically to identify open customer trouble tickets;

the computer-readable program code that is configured to accept being further configured to update the customer trouble ticket status information in response to receipt of the status change message.

18. A computer program product according to claim 17 wherein the computer-readable program code that is configured to accept is further configured to allow customer access, via the network, to the customer trouble ticket status that is updated.

19. A computer program product according to claim 17 wherein the computer-readable program code that is configured to accept is further configured to inform the customer, via electronic mail (email), that the customer trouble ticket status has been updated.

20. A computer program product according to claim 17 wherein the computer-readable program code that is configured to manage is further configured to allow selection by an operator of the PSTN and/or by a customer, of the change in status and/or the customer trouble ticket for which a status change message is automatically pushed to the computer-readable program code that is configured to accept.

21. A computer program product according to claim 17 wherein the computer-readable program code that is configured to manage is further configured to automatically send a completion message to the computer-readable program code that is configured to accept upon completion of a customer trouble ticket as a result of repair services that are performed on the PSTN.

22. A computer program product that is configured to provide repair status updates for an administration system for a Public Switched Telephone Network (PSTN), the administration system comprising computer-readable program code that is configured to accept customer trouble tickets related to the PSTN via a network and to provide customer trouble ticket status information to customers via the network and computer-readable program code that is configured to manage repair services that are performed on the PSTN in response to the trouble tickets, the computer program product code that is configured to provide repair status updates comprising a computer usable storage medium having computer-readable program code embodied in the medium, the computer-readable program code comprising:

computer-readable program code that is configured to automatically push a status change message to the computer-readable program code that is configured to accept upon occurrence of a change in a status of a customer trouble ticket in the computer-readable program code that is configured to manage as a result of repair services that are performed on the PSTN and without being polled periodically to identify open customer trouble tickets.

23. A computer program product according to claim 22 wherein the computer program product that is configured to provide repair status updates further comprises:

computer-readable program code that is configured to receive the status change message and to update the customer trouble ticket status information in response to receipt of the status change message.

24. A computer program product according to claim 22 wherein the computer program product that is configured to provide repair status updates further comprises:

computer-readable program code that is configured to allow selection by an operator of the PSTN and/or by a customer, of the change in status and/or the customer trouble ticket for which a status change message is automatically pushed to the computer-readable program code that is configured to accept.

25. An administration method for a Public Switched Telephone Network (PSTN) comprising:

accepting customer trouble tickets related to the PSTN via a network;

managing repair services that are performed on the PSTN in response to the customer trouble tickets;

automatically pushing a status change message upon occurrence of a change in a status of a customer trouble ticket; and updating the customer trouble ticket status information in response to receipt of the status change message as a result of repair services that are performed on the PSTN and without being polled periodically to identify open customer trouble tickets.

26. A method according to claim 25 further comprising allowing customer access, via the network, to the customer trouble ticket status that is updated.

27. A method according to claim 25 further comprising informing the customer, via electronic mail (email), that the customer trouble ticket status has been updated.

28. A method according to claim 25 further comprising allowing selection by an operator of the PSTN and/or by a customer, of the change in status and/or the customer trouble ticket for which a status change message is automatically pushed.

29. A method according to claim 25 further comprising automatically sending a completion message upon completion of a customer trouble ticket as a result of repair services that are performed on the PSTN.

30. A repair status update method for an administration system for a Public Switched Telephone Network (PSTN), the administration system being configured to accept customer trouble tickets related to the PSTN via a network and to manage repair services that are performed on the PSTN in response to the trouble tickets, the repair status update method comprising:

automatically pushing a status change message upon occurrence of a change in a status of a customer trouble ticket as a result of repair services that are performed on the PSTN and without being polled periodically to identify open customer trouble tickets.

31. A method according to claim 30 wherein the repair status update method further comprises:

updating the customer trouble ticket status information in response to receipt of the status change message.

32. A method according to claim 30 wherein the repair status update method further comprises allowing selection by an operator of the PSTN and/or by a customer, of the change in status and/or the customer trouble ticket for which a status change message is automatically pushed.

* * * * *